United States Patent
Houssat et al.

(10) Patent No.: US 10,829,093 B2
(45) Date of Patent: Nov. 10, 2020

(54) ADAPTER FORMING PART OF A WIPER SYSTEM

(71) Applicant: Valeo Systèmes d'Essuyage, Le Mesnil Saint Denis (FR)

(72) Inventors: Stéphane Houssat, Issoire (FR); Vincent Gaucher, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 253 days.

(21) Appl. No.: 15/718,891

(22) Filed: Sep. 28, 2017

(65) Prior Publication Data
US 2018/0086312 A1 Mar. 29, 2018

(30) Foreign Application Priority Data
Sep. 29, 2016 (FR) ...................................... 16 59353

(51) Int. Cl.
*B60S 1/40* (2006.01)

(52) U.S. Cl.
CPC ........... *B60S 1/4006* (2013.01); *B60S 1/4048* (2013.01); *B60S 2001/4051* (2013.01); *B60S 2001/4054* (2013.01); *B60S 2001/4093* (2013.01)

(58) Field of Classification Search
CPC ........ B60S 1/40; B60S 1/4038; B60S 1/4048; B60S 1/4064; B60S 1/3429; B60S 1/4006; B60S 2001/4054; B60S 2001/4093; B60S 2001/4051

USPC ....................................................... 15/250.32
See application file for complete search history.

(56) References Cited

U.S. PATENT DOCUMENTS

| 2013/0167317 | A1 | 7/2013 | Oslizlo et al. |
| 2013/0239356 | A1 | 9/2013 | Yoshimoto et al. |
| 2016/0107615 | A1* | 4/2016 | Young, III ............ B60S 1/387 15/250.32 |
| 2016/0207502 | A1 | 7/2016 | Avasiloaie et al. |

FOREIGN PATENT DOCUMENTS

| FR | 3026074 A1 | 3/2016 |
| WO | 2013/013835 A1 | 1/2013 |
| WO | 2016/061461 A1 | 4/2016 |

OTHER PUBLICATIONS

Preliminary Search Report and Written Opinion issued in corresponding French Application No. 1659353, dated May 30, 2017 (6 pages).

* cited by examiner

*Primary Examiner* — Andrew A Horton
(74) *Attorney, Agent, or Firm* — Osha Bergman Watanabe & Burton LLP (57) ABSTRACT

The invention concerns an adapter (2) intended to be fitted to an end part of a drive arm, the adapter (2) comprising at least one front part (11), at least one section of which is U-shaped, and at least one rear part (12), at least one section of which is U-shaped, characterized in that the front part (11) and the rear part (12) are hinged together via a hinge means (13).

10 Claims, 8 Drawing Sheets figure 1 figure 2 figure 3 figure 4 figure 5 figure 6 figure 7 figure 8 figure 10 figure 9 figure 11

ADAPTER FORMING PART OF A WIPER SYSTEM

The present invention relates to wiper systems for motor vehicles, and more particularly concerns an adapter which forms part of such a wiper system.

A wiper system, generally known as a windscreen wiper, for a motor vehicle is intended to remove by sweeping liquids and dirt that may disrupt the vision which a driver of the motor vehicle has of his environment. These wiper systems generally comprise a drive arm which performs an angular reciprocating motion around a rotation axis, and an elongate wiper arm equipped with a scraper blade made of a resilient material. By wiping over a front or rear glazed surface of the motor vehicle, the scraper blade sweeps away water and some dirt, and removes these from the driver's field of vision.

Whatever the configuration of the wiper blade, i.e. a wiper blade with articulated clips which retain the scraper blade in several distinct zones, or a wiper blade with a metallic strip which holds the scraper blade over its entire length, the wiper blade is attached to an end part of the drive arm via a connecting device which comprises a connector mounted fixedly on the wiper blade.

In a first known connecting mode, an adapter, suitable for being attached to the connector of the wiper blade, is mounted movably by pivoting around a fixing axis on the end part of the drive arm. This first connecting mode is normally used for wipers intended for the glazed surfaces at the front of the motor vehicle. In a second known connecting mode, the connector is connected to a shaft which is secured to the drive arm. This second connecting mode is normally found in wiper systems intended for the glazed surfaces at the rear of the motor vehicle.

The closest prior art is formed by document US2013/0239356A1 which describes a fixing device comprising a connector carrying the wiper blade, and an adapter connecting the connector to an end part of the drive arm.

A general problem posed in the field lies in the need to provide an adapter able to cooperate effectively and reliably with an end part of a drive arm, which is liable to be of varied shape.

More particularly, it is desirable to have an adapter which allows simple and rapid maintenance operations on the wiper system in order to allow an inexperienced user to perform them easily. In particular, it is desirable that an operation of replacing a worn wiper blade by a new wiper blade can be carried out easily and without risk of damaging the connecting device and more particularly the adapter.

Even more particularly, it is desirable to have an adapter which prevents the unintentional release of the adapter attached to the end part of the drive arm during use of the wiper system which is in motion over the glazed surface.

One aim of the present invention is to propose an adapter which is arranged to allow simple and rapid maintenance operations while ensuring a robust and reliable connection between a wiper blade and an end part of the drive arm.

An adapter of the present invention is an adapter intended to be fitted to an end part of a drive arm. The adapter comprises at least one front part, at least one section of which is U-shaped, and at least one rear part, at least one section of which is U-shaped, characterized in that the front part and the rear part are hinged together via a hinge means.

The adapter advantageously comprises at least one of the following characteristics taken alone or in combination:

- the hinge means is for example a hinge acting by flexion of a constituent material of the adapter,
- the U-shaped section of the front part is delimited by a front upper wall, a left front side wall and a right front side wall, whereas the U-shaped section of the rear part is delimited by a rear upper wall, a left rear side wall and a right rear side wall,
- the hinge means is interposed between the left front side wall and the left rear side wall, and the hinge means is interposed between the right front side wall and the right rear side wall,
- the hinge means forms part of a lower edge of the adapter, the lower edge being arranged opposite the front upper wall and the rear upper wall in the vertical axis,
- the front part and the rear part are aligned in a longitudinal axis. Thus at least the front upper wall is coplanar with the rear upper wall. In addition or alternatively, the left front side wall is coplanar with the left rear side wall, and/or the right front side wall is coplanar with the right rear side wall,
- the front part and the rear part are aligned in a longitudinal axis, and at least a first plane which contains the front upper wall forms an angle not equal to zero with a second plane which contains the rear upper wall,
- the front part comprises a body and a front end, the body being connected to the rear part via the hinge means,
- the adapter may comprise a rotation means configured to connect the adapter to a connector,
- the front end and the body are delimited by a rim which overhangs the body,
- the rim is fitted with at least one hook. It is noted that the hook and the front upper wall are arranged to clamp a first wall of the end part of the drive arm,
- the rear upper wall is equipped with a knob provided with a tooth,
- an opening slot is arranged between the front part and the rear part,
- the opening slot is arranged for example between the hinge means and the upper walls,
- the opening slot is in particular edged by a rear edge forming part of the front part and by a front edge forming part of the rear part,
- the front part and the rear part are movable about a hinge axis, parallel to a transverse axis, between a rest position in which the front upper wall and the rear upper wall form a first angle not equal to zero, and a usage position in which the front upper wall and the rear upper wall form a second angle smaller than the first angle,
- the front upper wall and the rear upper wall again form an angle smaller than the second angle in the mounting position of the adapter. Such an angle may be equal to 0° or be negative relative to the second angle,
- the rear edge and the front edge in the rest position form a third angle not equal to zero, and in a usage position form a fourth angle smaller than the third angle,
- in the mounting position of the adapter, the rear edge and the front edge form an angle smaller than the fourth angle. Such an angle may be equal to 0° or be negative relative to the fourth angle,
- at least one rear side wall is equipped with a groove delimited by at least one ramp.

Such a groove guarantees a minimum lateral play between a transverse dimension of the adapter and a transverse dimension of the end part, while allowing automatic mounting of the adapter in the end part, in particular by the controlled pivoting of the rear part. Advantageously, the ramp is configured to cooperate with at least one stud arranged on an inner face of the end part of the drive arm, the adapter is provided with a means for actuating the rear part of the adapter. Such an actuating means takes the form of a plate which protrudes longitudinally to the rear of the rear part of the adapter. This actuating means is the zone in which the user manually applies a force to attach or separate the adapter relative to the end part of the drive arm.

The present invention also concerns a connecting device formed by a connector and an adapter as described in the present document, joined together for example by the rotation means. The connector is for example housed at least partially in an inner volume of the adapter.

The invention also covers a drive arm comprising at least one U-shaped end part delimited by a first wall and by two second walls defining an inner volume receiving an adapter as described in this document, or a connecting device as presented above.

Advantageously, the first wall is provided with an orifice for receiving a knob provided with a tooth, the orifice comprising a front transverse edge against which the knob rests, the tooth extending above the first wall.

The invention also concerns a wiper system comprising a drive arm, a connector attached to a wiper arm and an adapter according to any of its defining characteristics, connecting the connector to the drive arm rotationally.

The present invention also concerns a method for assembling an adapter as described in the present document to an end part of a drive arm, wherein the assembly method comprises:
  a first step of bringing a rim of the adapter into contact with a front edge of a first wall of the end part,
  a second step which comprises rotating the adapter relative to the end part around the contact between the rim and the front edge, performed during the first step,
  a fifth step in which a tooth of a knob of the adapter passes over the first wall and extends above this.

Advantageously, between the second and fifth steps, alternatively or cumulatively, the following steps are performed:
  a third step which consists of manual locking of the adapter into the end part,
  a fourth step which consists of automatic locking of the adapter into the end part.

Further characteristics, details and advantages of the invention will arise more clearly from reading the description below, given merely for information, in connection with the drawings in which.

Figure 1:
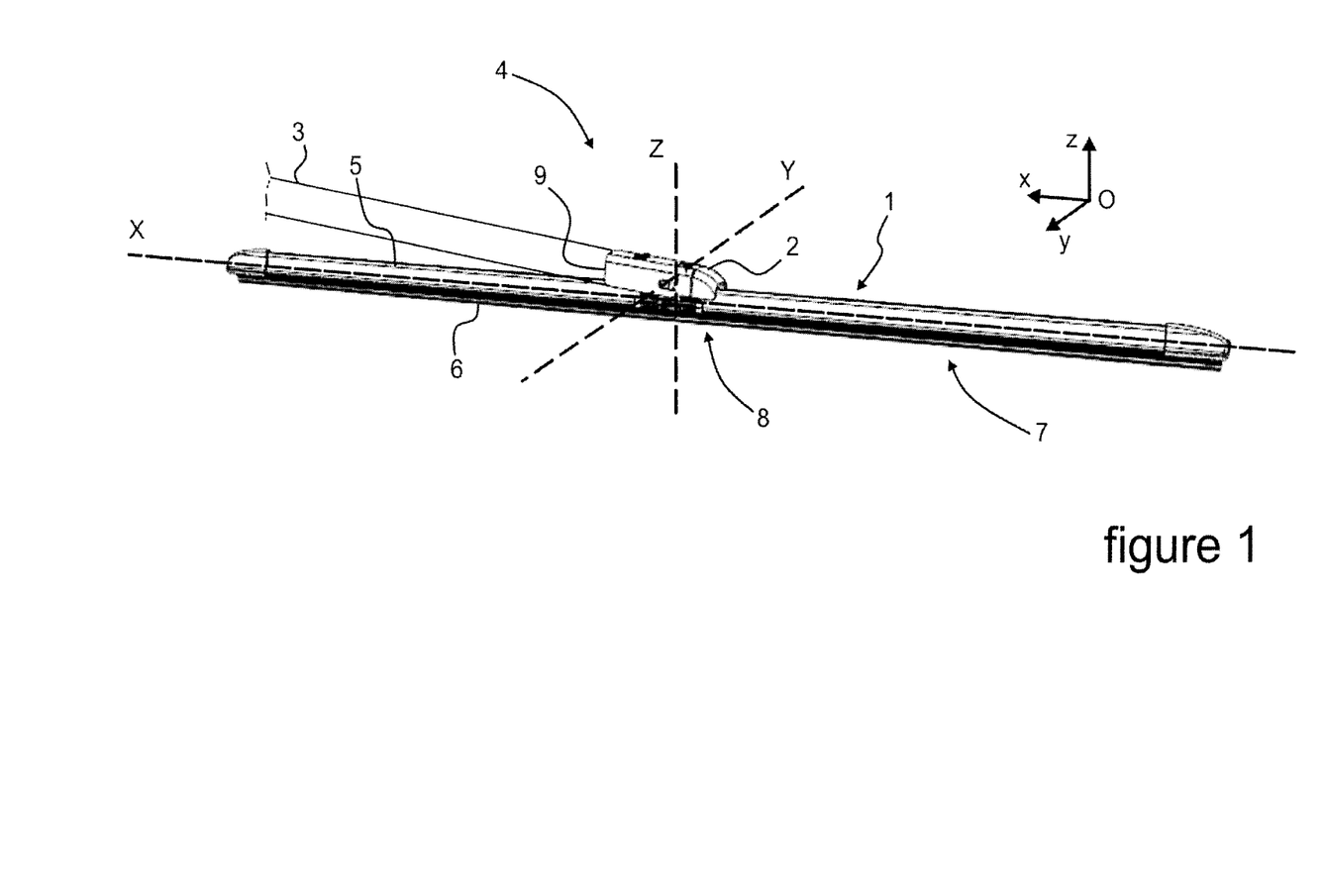
FIG. 1 is a perspective view of a wiper system according to the invention.

On the figures, the terms "longitudinal", "transverse", "vertical", "side", "front", "rear", "left", "right", "upper" and "lower" refer to the orientation of a wiper blade 1 illustrated in FIG. 1. A longitudinal direction corresponds to a longitudinal axis X in which the wiper blade 1 and/or an adapter 2 of the present invention extends. A transverse direction corresponds to that of a transverse axis Y which is perpendicular to the longitudinal axis X. The terms "left" and "right" relate to a position along the transverse axis Y, on either side of the longitudinal axis X. A vertical direction, parallel to that of the vertical axis Z, is perpendicular to the above-mentioned longitudinal and transverse directions. The terms "upper" and "lower" relate to orientations parallel to the vertical axis Z, the term "lower" containing the plane of the windscreen. For the longitudinal directions, the terms "outer" or "inner" relate to a pivot point of the wiper blade 1 on a drive arm 3 of the wiper blade 1, the term "inner" relating to the part where the drive arm 3 and half a blade extend, the term "outer" corresponding to the part where the other half blade extends.

The directions mentioned above are illustrated in a orthonormal reference system Oxyz shown on the figures. In this system, axis Ox represents the longitudinal direction, axis Oy represents the transverse direction, and axis Oz represents the vertical direction.

On FIG. 1, a motor vehicle is currently equipped with a wiper system 4 for evacuating water and/or dirt present on a glazed surface, in particular a rear window or front windscreen of a motor vehicle. The wiper system 4 comprises the drive arm 3 which is able to perform an angular reciprocating movement along and over the glazed surface.

The wiper system 4 also comprises the wiper blade 1 which extends along a main axis, called the longitudinal axis X, parallel to axis Ox. The wiper blade 1 comprises at least one air deflector 5 and a scraper blade 6. The air deflector 5 is intended to transform a pressure applied by an air flow circulating along the glazed surface into a rest force of a wiper blade 1 against the glazed surface of the motor vehicle. The scraper blade 6 is the part of the wiper blade 1 in direct contact with the glazed surface, for evacuating water and/or dirt present thereon. The air deflector 5 and the scraper blade 6 form a semi-rigid assembly 7 which is carried by a connecting device 8 interposed between the drive arm 3 and the semi-rigid assembly 7.

The connecting device 8 ensures a mechanical connection between an end part 9 of the drive arm 3 and the wiper blade 1, and thus allows separation of the wiper blade 1 from the drive arm 3 for the purpose of replacing the wiper blade 1. The present invention in particular intends to propose an adapter 2 which is designed to facilitate such a replacement operation while effectively securing said mechanical connection. In other words, the adapter 2 is particularly appropriate for the sale of the wiper blade 1 in the after-sales market.

Figure 2:
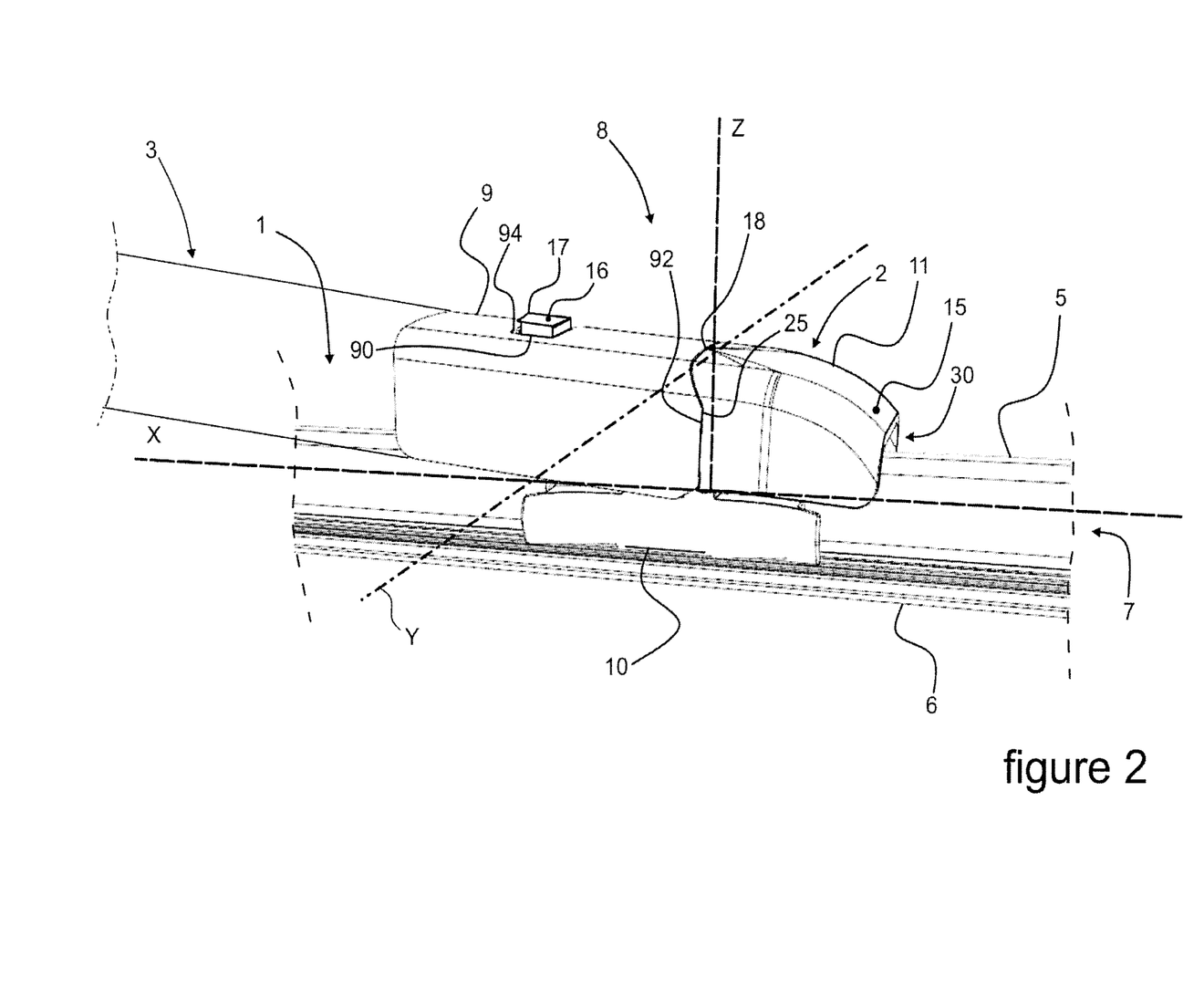
FIG. 2 is a view of a connecting device of the present invention forming part of the wiper system illustrated in FIG. 1.

In general, the connecting device 8 of the present invention comprises in total two parts, the adapter 2 and a connector 10, shown together on FIG. 2, where the adapter 2 of the present invention is in the usage position. In this usage position, the adapter 2 is attached to the end part 9 of the drive arm 3 according to a method of the invention described below.

The connector 10 is able to carry the wiper blade 1 and is mounted in rotation on the adapter 2. The adapter 2 is intended to be fixed to the end part 9 of the drive arm 3.

According to one embodiment of the invention, the adapter 2 and the connector 10 are made by moulding from a synthetic material, such as material from the polyoxymethylene family, known under the acronym POM, or by moulding of a mixture of polymer materials, for example a mixture of polymers of the polycarbonate family and of the acrylonitrile butadiene styrene family, known under the acronym ABS. The adapter 2 firstly and the connector 10 secondly are each made of one piece. In other words, the adapter 2 firstly and the connector 10 secondly are monoblock parts and cannot be divided into several pieces without destruction of the adapter 2 or the connector 10. The end part 9 is for example made by folding a metal strip, such as a metal plate or similar, or by moulding from a synthetic material.

Figure 3:
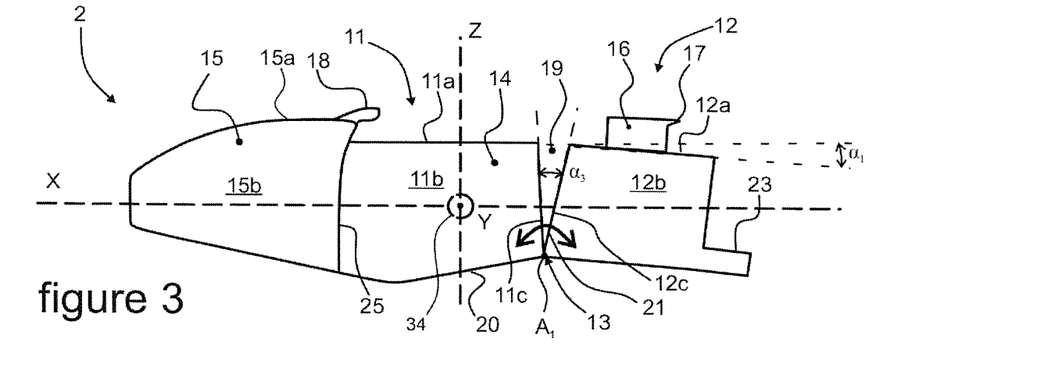
FIG. 3 is a side view of an adapter which forms part of the connecting device illustrated in FIG. 2 and which is shown in the rest position.
Figure 4:
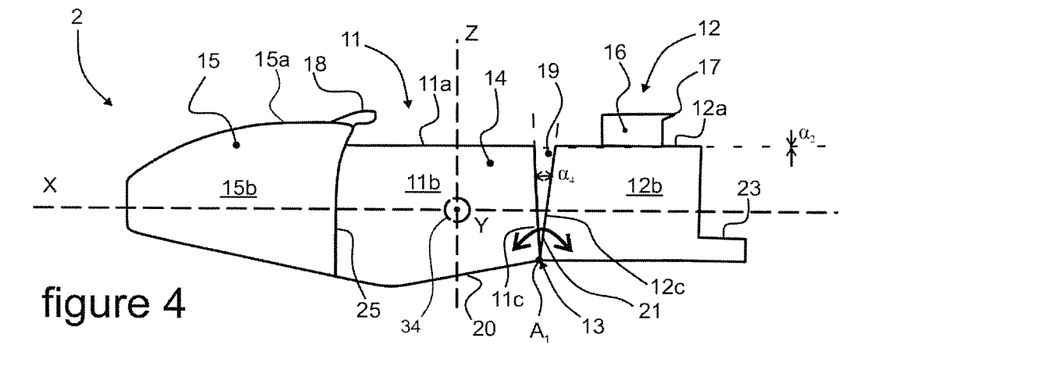
FIG. 4 is a side view of the adapter illustrated in FIG. 2 and which is shown in the usage position.
Figure 5:
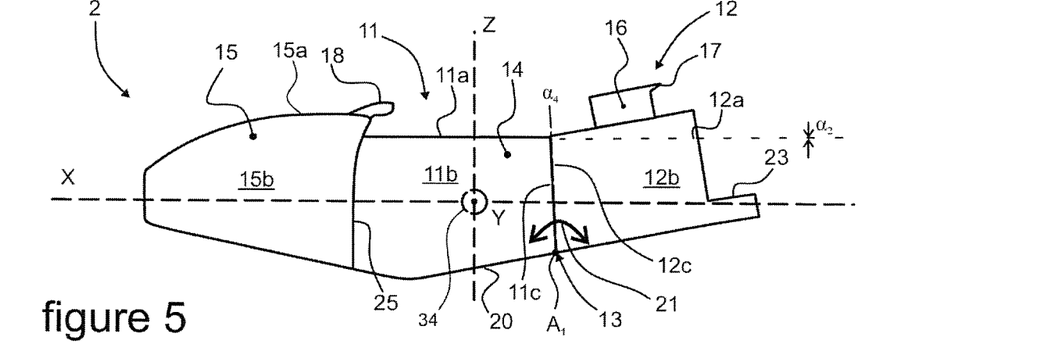
FIG. 5 is a side view of the adapter illustrated in FIG. 2 and which is shown in the mounting position.

With reference to FIGS. 3 to 5, the adapter 2 extends in the longitudinal axis X and comprises a front part 11 and a rear part 12 which are hinged together. The front part 11 and the rear part 12 succeed each other along the longitudinal axis X and are therefore aligned one behind the other in the longitudinal axis X. The front part 11 and the rear part 12 are movable relative to each other about a pivot axis A1, which is orthogonal to the longitudinal axis X and to the vertical axis Z, and parallel to the transverse axis Y. In other words, the front part 11 and the rear part 12 are mounted pivotably relative to each other about the pivot axis A1. The front part 11 and the rear part 12 are connected together by a hinge means 13 which is interposed between the front part 11 and the rear part 12 and forms a means of connection between the front part 11 and the rear part 12.

The front part 11 of the adapter 2 comprises a body 14 and a front end 15. The body 14 is the portion of the front part 11 which is connected to the rear part 12 via the hinge means 13. The body 14 is placed in the intermediate position between the front end 15 and the rear part 12. The front end 15, otherwise known as the adapter head, forms the end portion of the front part 11 which is situated longitudinally opposite the rear part 12. In other words, the rear part 12, the hinge means 13, the body 14 and the front end 15 are arranged successively along the longitudinal axis X from the rear of the adapter 2 towards its front.

The front part 11 forms a fixed reference relative to the rear part 12, the latter being the portion of the adapter 2 which rotates around the first part 11 via the hinge means 13.

The front part 11 and the rear part 12 both have a U-shaped transverse profile. In other words, in a cross-section produced along a cutting plane parallel to plane Oyz, the front part 11 and the rear part 12 comprise a U-shaped transverse profile which gives the adapter 2 a hollowed structure, which is advantageously lightweight due to material saving. In other words, the front part 11 has a front upper wall 11a which forms the base of the U, and two front side walls 11b, 11 b' which are in particular parallel or substantially parallel to each other, and orthogonal or substantially orthogonal to the front upper wall 11a, and which form the arms of the U.

The adapter 2 also comprises a rotation means 34 arranged to connect the adapter 2 to the connector 10 while allowing a rotation of the one relative to the other. This rotation means 34 allows this rotation about the transverse axis Y. The rotation means may be formed by a pair of stranded wires which emerge into the hollowed structure of the adapter. They may also be bearings arranged in the front side walls 11b, 11 b'.

Advantageously, the rotation means 34 is arranged longitudinally on the adapter between the front end 15 and the hinge means 13.

The rear part 12 comprises a rear upper wall 12a which forms the base of the U, and two rear side walls 12b, 12b' which are parallel or substantially parallel to each other, and orthogonal or substantially orthogonal to the rear upper wall 12a, and which form the arms of the U.

More particularly, the front part 11 comprises a left front side wall 11b and a right front side wall 11b', while the rear part 12 comprises a left rear side wall 12b and a right rear side wall 12b'. Preferably, the left front side wall 11b and the left rear side wall 12b are coplanar or substantially coplanar. Preferably, the right front side wall 116 and the right rear side wall 12b' are also coplanar or substantially coplanar.

The left front side wall 11b and the left rear side wall 12b firstly, and the right front side wall 11b' and the right rear side wall 12b' secondly, are advantageously connected together by the hinge means 13. In other words, the hinge means 13 is interposed between the left front side wall 11b and the left rear side wall 12b on one side, and between the right front side wall 11b' and the right rear side wall 126 on the other.

Also, the front part 11 comprises a rear edge 11c which faces a front edge 12c of the rear part 12. The hinge means 13 connects the rear edge 11c and the front edge 12c.

On FIG. 3, the adapter 2 is shown in the rest position, whereas on FIG. 4 the adapter 2 is shown in the usage position, i.e. as the adapter 2 illustrated on FIG. 2. FIG. 5 finally shows the adapter 2 in the mounting position. In other words, on FIG. 3 the adapter is shown alone, as it leaves the mould for example, whereas on FIG. 4 the adapter 2 is shown as if the adapter 2 were attached to the end part 9 of the drive arm 3, which is not shown on FIG. 4 for better legibility. Finally, the adapter 2 shown on FIG. 5 is in the situation where a force is being exerted on the rear part 12 with the aim of mounting or removing the adapter 2 on or from the end part 9.

On FIG. 3, the front upper wall 11a and the rear upper wall 12a form a first angle $\alpha_1$ not equal to zero, whereas on FIG. 4, the front upper wall 11a and the rear upper wall 12a are coplanar and form a second angle $\alpha_2$ which in the present case is substantially zero, following implementation of the method of the invention described below. In another exemplary usage position, the second angle $\alpha_2$ may be different from 0°, being positive or negative, provided that the second angle $\alpha_2$ is smaller than the first angle $\alpha_1$. In the mounting position as shown on FIG. 5, the angle formed between the front upper wall 11a and the rear upper wall 12a is less than 0°, and in any case smaller than the second angle $\alpha_2$. The angles mentioned above are measured between a first plane in which the front upper wall 11a extends, and a second plane in which the rear upper wall 12a extends.

Also on FIG. 3, the rear edge 11c and the front edge 12c form a third angle $\alpha_3$ not equal to zero, preferably between 4° and 6°, preferably equal to 5°, whereas on FIG. 4 the rear edge 11c and the front edge 12c form a fourth angle $\alpha_4$ which is strictly smaller than the third angle $\alpha_3$, this fourth angle $\alpha_4$ defining the usage position. It is noted that in the mounting position as shown on FIG. 5, the fourth angle may be zero, in particular when the rear edge 11c is resting against the front edge 12c so as to allow a tooth 17 arranged on the knob 16 to pass over a first wall 95 of the end part 9. In this situation, an opening slot 19 provided between these two edges is closed. The slot 19 is described as opening in the sense that it separates the front upper wall 11a from the rear upper wall 12a. The portion of the opening slot 19 provided between the front and rear side walls widens as it leaves a lower edge 20 in the direction towards the upper walls 11a, 12a.

The rear upper wall 12a is provided with a knob 16 which emerges above the rear upper wall 12a. In other words, the knob 16 overhangs the rear upper wall 12a as it is placed above a plane formed by the latter. The knob 16 is shaped to engage inside an orifice 90 on the end part 9 of the drive arm 3, as illustrated on FIG. 2. The knob 16 comprises a tooth 17 which overhangs and extends above the rear upper wall 12a. Such a tooth 17 forms a flange arising from the knob 16 and extending longitudinally towards the back. In other words, the tooth 17 of the knob 16 forms a pro-eminence. The knob 16, in particular its tooth 17, is arranged to catch behind a thickness of a first wall 95 of the end part 9 of the drive arm 3. It is noted that the length of the knob 16 plus its tooth 17, measured in the longitudinal direction Ox, is less than a length of the orifice 90 measured in the same direction. Thus the knob 16 with its tooth 17 may pass through the orifice 90.

The front end 15 for example is provided with a hook 18 which at least partially overhangs the front upper wall 11a of the body 14. The hook 18 is preferably arranged at an equal distance from both the front side walls 11b. In other words, the hook 18 is preferably arranged in a median longitudinal plane of the adapter 2.

The front side walls 11b, 11b' and the rear side walls 12b, 12b' are separated from each other by the opening slot 19 which extends between the hinge means 13 on one side and the front upper wall 11a and the rear upper wall 12a of the adapter 2 on the other side. The opening slot 19 allows passage of the front side walls 11b and rear side walls 12b on a pivoting movement 21 between the front part 11 and the rear part 12 around the hinge means 13. In other words, during the pivot movement 21 of the front part 11 and/or the rear part 12 around the hinge means 13, the rear edge 11c of the front part 11 and the front edge 12c of the rear part 12 are able to move closer together or move further apart due to the shrinking or enlarging of the opening slot 19. The opening slot 19 is for example V-shaped as illustrated on FIGS. 3 to 8.

The rear part 12 is for example provided with an actuating means 23, one example of which is formed by a plate which extends inside a plane parallel to plane Oxy when the adapter 2 is in the usage position, at the rear of the rear part 12 and in a longitudinal direction. The actuating means 23 forms a handling element of the rear part 12, to cause the latter to pivot between the rest position of the adapter 2 and the mounting position of the adapter 2. Such an actuating means 23 allows the adapter 2 to be joined to or separated from the end part 9 of the drive arm 3.

Figure 6:
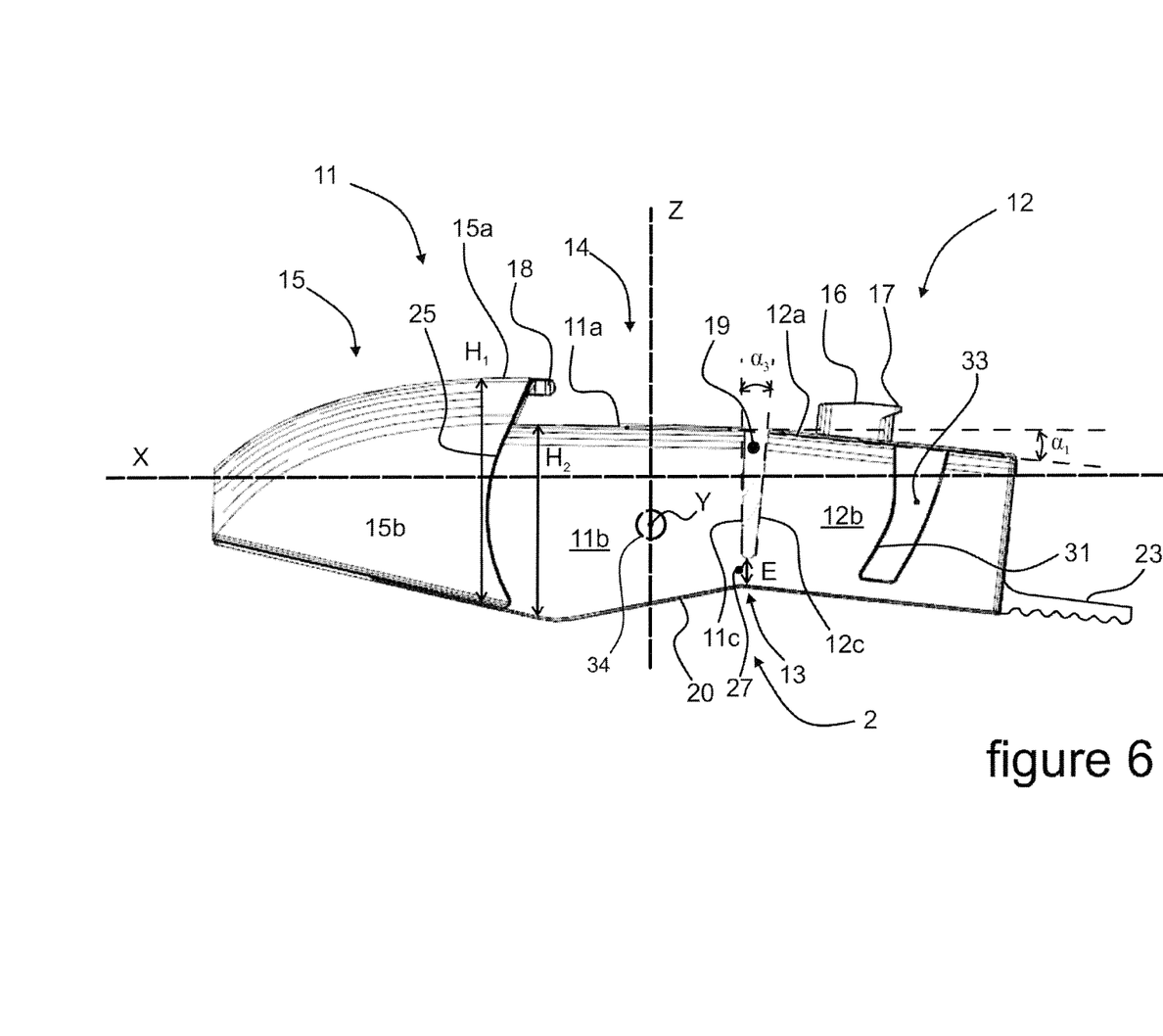
FIG. 6 is a side view of a variant embodiment of the adapter shown in FIGS. 2 to 5.

On FIG. 6, the front end 15 is profiled towards the front of the adapter 2 such that the front end 15 has a height, measured between an upper wall 15a of the front end 15 and the lower edge 20 of the adapter 2 in the vertical axis Z, which reduces from the body 14 towards the front of the front end 15. The front end 15 forms a nose which longitudinally extends the end part 9 so as to profile it.

At the limit of the front part 11 and of the front end 15, the latter has a first vertical height H1, measured between the upper wall 15a of this front end 15 and the lower edge 20 of the adapter 2 in the direction Oz, which is greater than a second vertical height H2 of the body 14, measured between the front upper wall 11a and the lower edge 20 of the adapter 2 in the same direction Oz. In other words, the front end 15 is higher than the first part 11 of the adapter 2, this height difference being for example equal to a thickness of the end part 9 of the drive arm 3. In complementary fashion, the front end 15 also protrudes above the first part 11, longitudinally straddling this at least partially.

Figure 7:
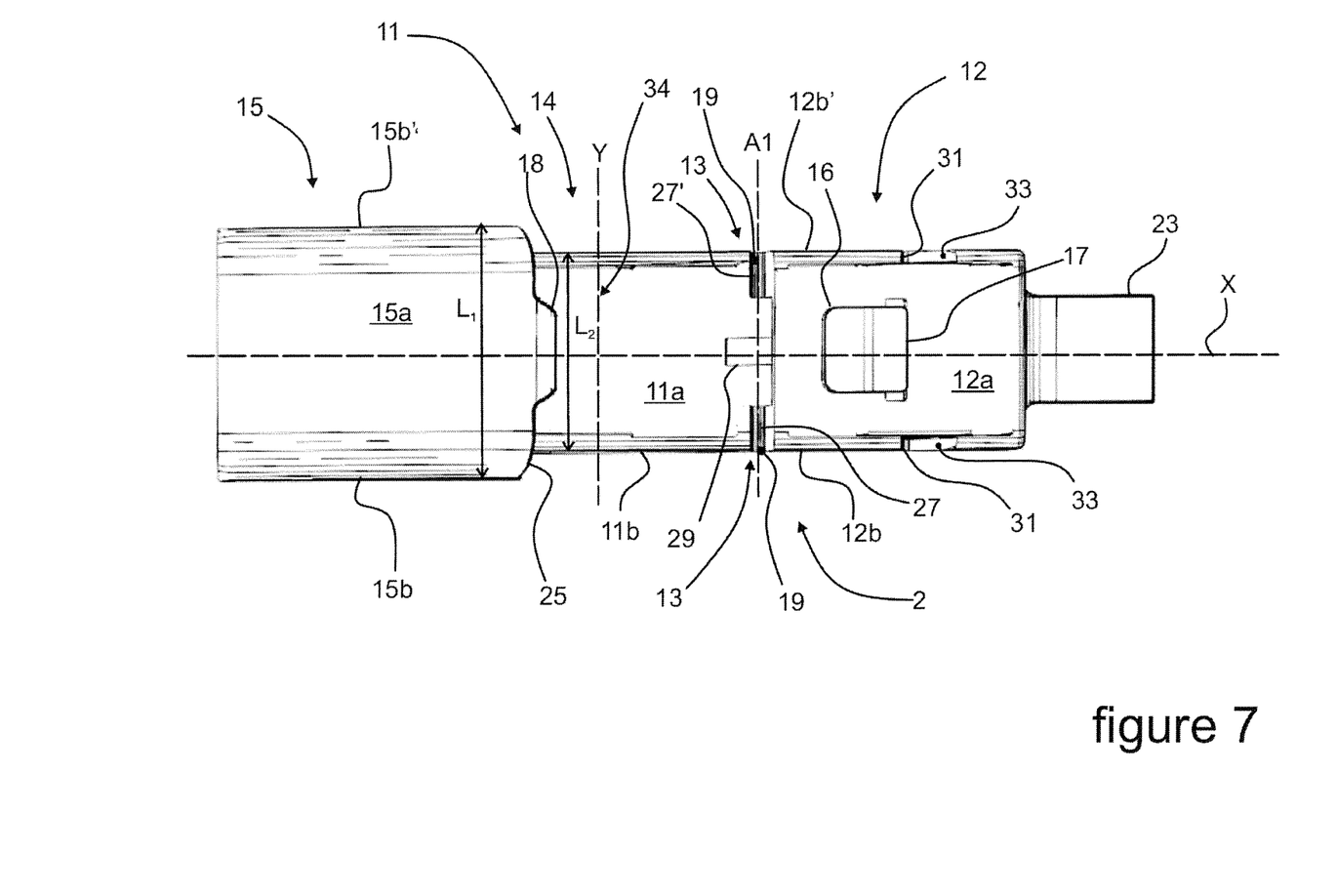
FIG. 7 is a top view of the adapter shown in FIG. 6.

With reference now to FIG. 7, at the limit of the front part 11 and the front end 15, the latter has a first transverse width L1, measured between the front side walls 15b, 15b' of the front end 15 in the transverse axis Y, which is greater than the second transverse width L2 of the body 14, measured between the left front side wall 11b and the right front side wall 11b' in the transverse axis Y. As a result, the front end 15 comprises a rim 25, otherwise called a shoulder, which emerges above the front upper wall 11a of the body 14. In other words, the front end 15 is wider than the first part 11 of the adapter 2. In complementary fashion, the front end 15 also protrudes on each side of the first part 11. This difference in width is for example equal to twice the thickness of the wall forming part of the end part 9 of the drive arm 3.

The rim 25 constitutes a stop against a front edge 92 on the end part 9 of the drive arm 3.

The rim 25 is in particular equipped with a hook 18. The hook 18 may be a protuberance on the upper wall 15a of the front end 15 as shown on FIGS. 3 to 5, or an extension of this upper wall 15a from the rim 25 as shown on FIGS. 6 and 7.

The rear part 12 comprises at least one ramp 31, and in particular two ramps 31 which are arranged vertically in the rear side walls 12b, 12b' respectively. Each of the ramps 31 extends in a plane substantially parallel to the plane Oyz. The ramps 31 each delimit a groove 33 arranged in the left side wall 12b and in the right side wall 12W.

On FIG. 7, the hinge means 13 is for example formed by at least one yoke 27, 27' which connects the front part 11 and the rear part 12. The hinge means 13 comprises in particular a left yoke 27 connecting the left front side wall 11b and the left rear side wall 12b, and a right yoke 27' connecting the right front side wall 11b' and the right rear side wall 12b'. The hinge means 13 is simple to produce, in particular during moulding of the adapter 2, wherein a thickness E of the hinge means 13 (visible on FIG. 6) is for example less than 15% of the second height H2, the thickness E being measured in the vertical axis Z between the upper and lower edges of the yokes 27, 27'. Such a thickness of the yokes 27, 27' gives a flexibility to the hinge means 13, allowing articulation of the rear part 12 relative to the front part 11.

Figure 8:
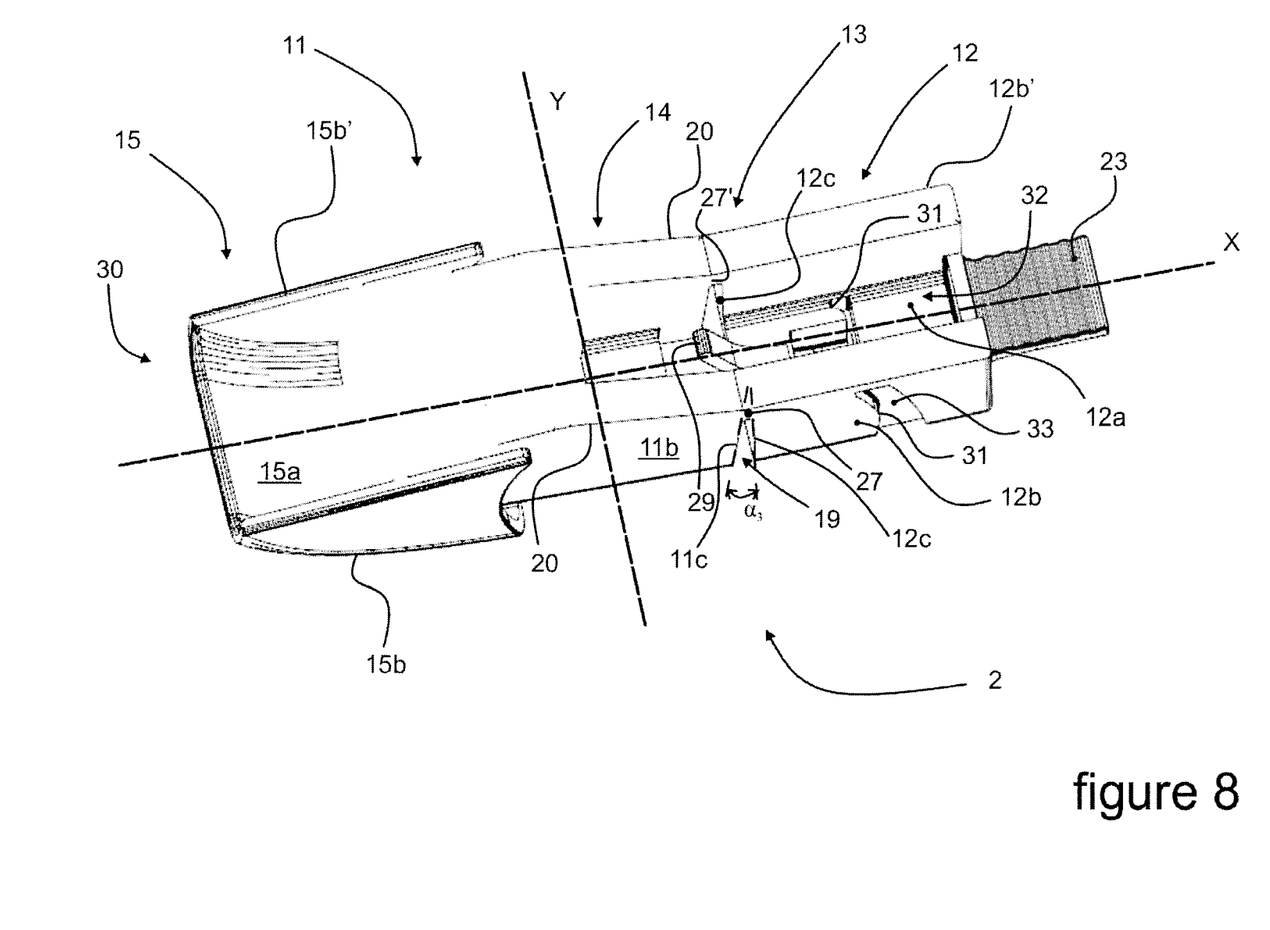
FIG. 8 is a perspective view from below of the adapter shown in FIGS. 6 and 7.

FIG. 8 shows the U-shaped section which the adapter 2 may have according to the invention. This U-shaped section is formed by the rear upper wall 12a and the rear side walls 12b, 12b', and by the front upper wall 11a and front side walls 11b, 11b'. This U-shape delimits an inner volume 32 intended to receive, at least partially, the connector 8 attached to the wiper blade 1.

This inner volume may also receive a tab 29 produced by moulding with the rear part 12, for example with the rear upper wall 12a of the rear part 12. The tab 29 is intended to come into contact with the connector 8 in the usage position of the adapter 2. Such a tab 29 forms a safety device for the mechanical connection between the adapter 2 and the end part 9 of the drive arm 3. In fact, once the adapter 2 is installed in the end part 9, the tab 29 blocks the pivoting of the rear part 12 relative to the front part 11, which prevents the knob 16 from leaving the orifice 90, for example when a traction force is exerted on the drive arm while the wiper blade 1 is retained on the windscreen by frost for example.

Figure 9:
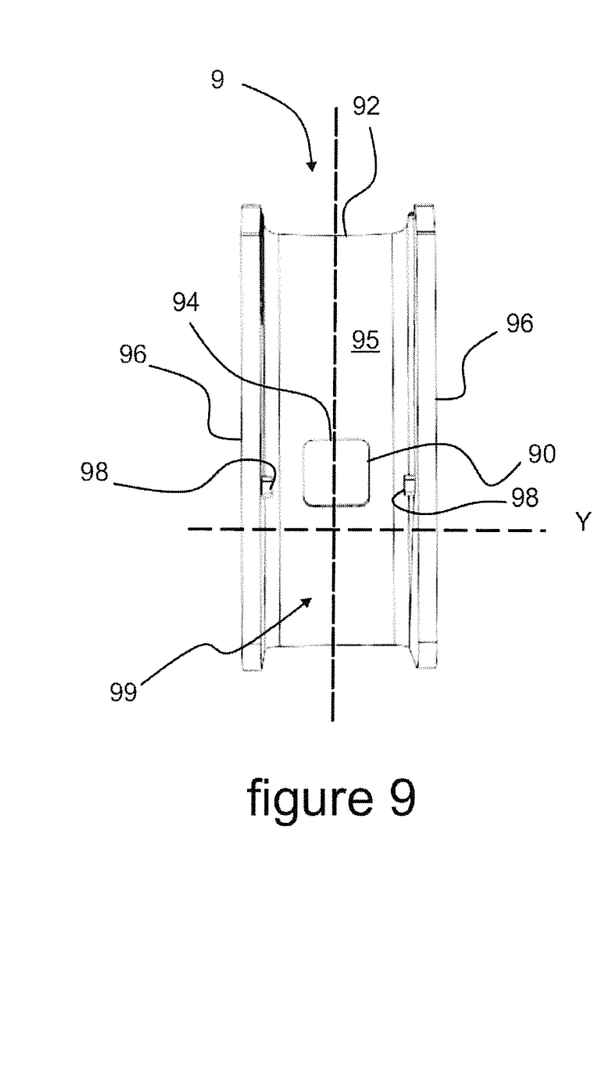
FIG. 9 is a view from below of an end part of a drive arm forming part of the wiper system illustrated in FIG. 1.
Figure 10:
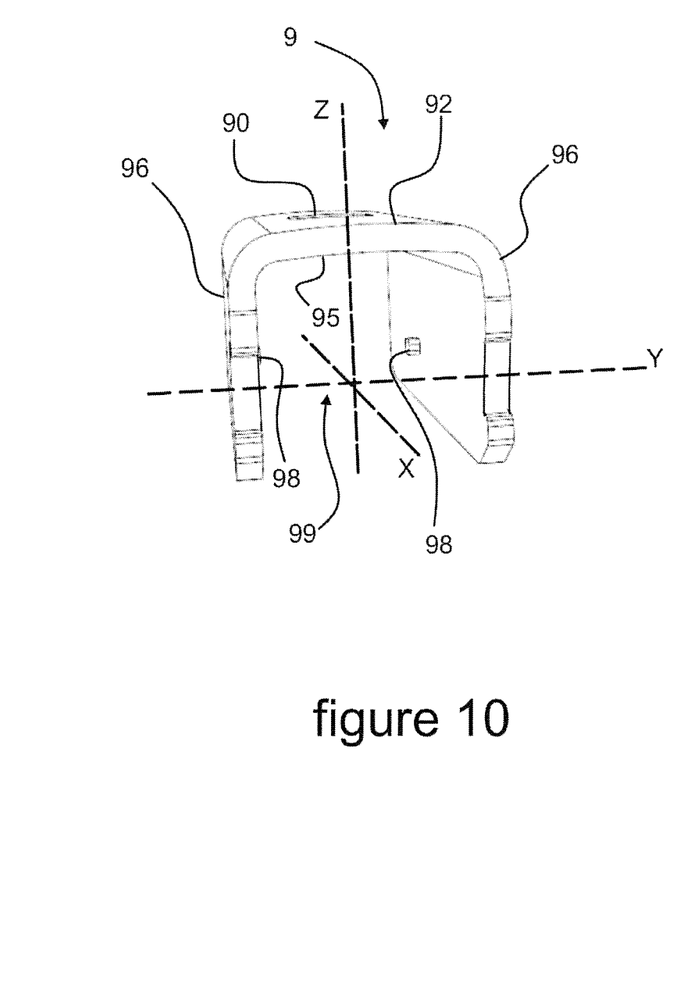
FIG. 10 is a perspective view from the front of the end part illustrated in FIG. 9.

On FIGS. 9 and 10, the end part 9 of the drive arm 3 is arranged in a U-shape viewed in cross-section parallel to plane Oyz. The end part 9 comprises a first wall 95 forming the base of the U, and two second walls 96 substantially parallel to each other and forming the arms of the U.

The first wall 95 is equipped with the orifice 90, the latter being centred laterally on the first wall 95 of the end part 9.

The first wall 95 and the second walls 96 are delimited in the front part by the front edge 92 which has a U-shaped transverse profile.

The second walls 96 each comprise an inner surface 97 which, with the first wall 95, delimits an inner volume 99 of the end part 9. Each inner surface 97 has a stud 98 which emerges from the inner surface 97 towards the inner volume 99. Each stud 98 is for example arranged in a cylinder with axis perpendicular to the inner surface 97. It is noted that the two studs 98 are situated at equal distances from the front edge 92, such that a straight line passing through the centre of the two studs 98 is parallel to the transverse axis Y.

The orifice 90 and the studs 98 are in particular arranged inside a transverse plane parallel to plane Oxy such that the orifice 90 vertically overhangs the studs 98.

Figure 11:
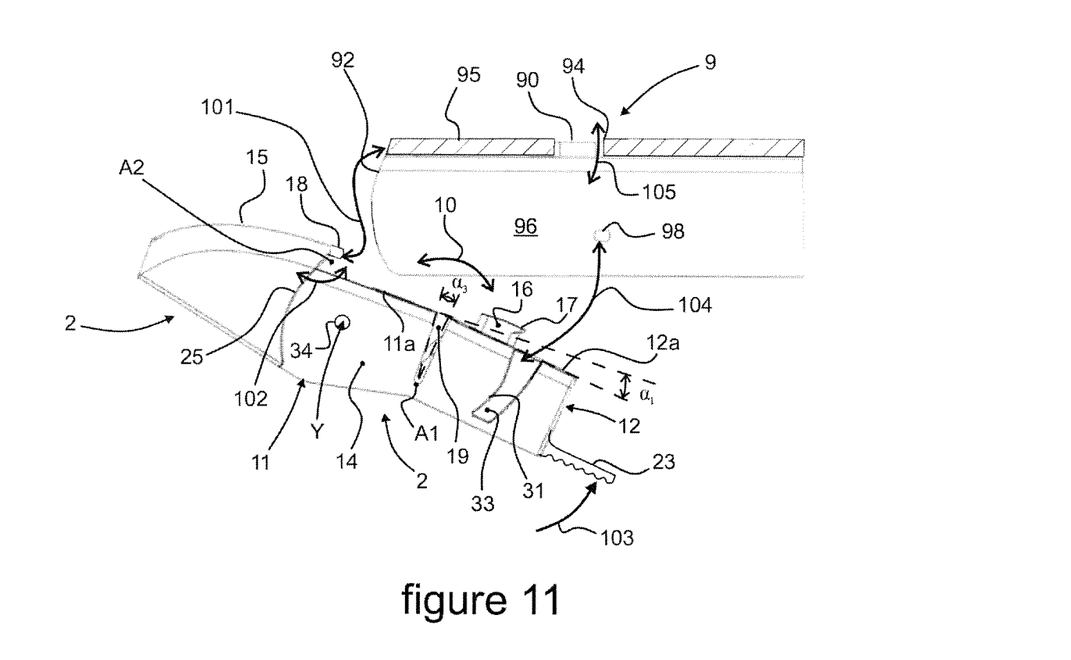
FIG. 11 is a diagrammatic illustration of the steps of a method of assembling the adapter illustrated in FIGS. 3 to 8 to an end part of a drive arm.

On FIG. 11, a method of assembling the adapter 2 with an end part 9 of the drive arm 3 comprises a first step 101 of bringing the hook 18 of the adapter 2 into contact with the front edge 92 of the first wall 95 of the end part 9. The first wall 95 thus comes to rest between the hook 18 and the front upper wall 11a of the front part 11.

In a second step 102 of the method, the adapter 2 is set in rotation on the end part 9 around a second rotation axis A2 which is substantially parallel to the transverse axis Y and passes through a contact point between the hook 18 and the front edge 92 when they are moved together during the first step 101. This rotation is operated until the knob 16 is arranged level with the orifice 90.

At this stage of the assembly process, the adapter 2 may be blocked in the end part 9 in two alternative or cumulative steps.

In one of these alternatives, the method comprises a third step 103 which consists of applying a force to the rear part 12 so as to move this towards the front part 11 via the hinge means 13. Such a force may be exerted by applying a manual pressure on the rear plate 23. This third step 103 leads to a reduction in the first angle $\alpha_1$ (FIG. 5) and to a reduction in the third angle $\alpha_3$ (FIG. 5). The opening slot 19 is then closed, which leads to the knob 16 drawing longitudinally closer to the front end 15. This longitudinal movement of the knob 16 shifts the tooth 17 so as to allow it to penetrate into the orifice 90. To summarise, the third step 103 consists of manual locking of the adapter 2 in the end part 9.

In the other alternative, the method comprises a fourth step which consists of automatic locking of the adapter 2 in the end part 9. By continuing the rotation which began in the second step 102, the studs 98 penetrate into the grooves 33. Thus, the studs 98 come to rest against the ramps 31 of the adapter 2 and slide against the latter. This resting creates a force which generates an alignment of the front upper wall 11a with the rear upper wall 12a, leading to a reduction in the first angle $\alpha_1$ (FIG. 5) and to a reduction in the third angle $\alpha_3$ (FIG. 5). The opening slot 19 is then closed, which leads to the knob 16 drawing longitudinally closer to the front end 15. This longitudinal movement of the knob 16 shifts the tooth 17 so as to allow it to penetrate into the orifice 90.

In both cases shown above, the result is an application of stress to the rear part 2 which then tries to resume its rest position in which the front upper wall 11a and the rear upper wall 12a form the second angle $\alpha_2$.

According to a fifth step 105, the rotation applied during the second step 102 is continued such that the tooth 17 passes over the first wall 95 and is situated above this. Once the rear upper wall 12a is resting against an inner face of the first wall 95 of the end part 9, the knob 16 is brought into contact against the front transverse edge 94 of the orifice 90 due to a tendency of the rear part 12 to resume its rest position when the flexion force is interrupted. The result is therefore an optimised locking of the adapter 2 in the end part 9, and a prevention of unintentional release of the adapter 2, once connected to the end part 9 of the drive arm 3, in particular during use of the wiper system 4 set in motion along the glazed surface.

The invention thus allows simple attachment of a wiper blade to an end part of an arm as illustrated in the present document. The adapter alone or the wiper blade comprising such an adapter forms a retail article sold in commercial after-sales outlets for motor vehicle parts.

The invention claimed is:

1. An adapter configured to be fitted to an end part of a drive arm, the adapter comprising:
   at least one front part, at least one section of which is U-shaped;
   and at least one rear part, at least one section of which is U-shaped,
   wherein the front part and the rear part are hinged together via a hinge,
   wherein the front part comprises a body and a front end, the body being connected to the rear part via the hinge,
   wherein the front end and the body are delimited by a rim which overhangs the body to form a recess for receiving a front edge of an upper wall of the end part of the drive arm,
   wherein the rim defines a rotation axis along a transversal direction of the adapter,
   wherein, during assembling the adapter with the end part of the drive arm, the adaptor and the end part of the drive arm are rotationally connected around the rotation axis, wherein the body comprises a rotation means arranged to rotatably connect the adapter to a connector.

2. The adapter according to claim 1, wherein the hinge is interposed between a left front side wall and a left rear side wall, and wherein the hinge is interposed between a right front side wall and a right rear side wall.

3. The adapter as claimed in claim 1, wherein the front part and the rear part are aligned along a longitudinal axis of the adapter.

4. The adapter according to claim 1, wherein the rim is fitted with at least one hook.

5. The adapter as claimed in claim 1, further comprising a rotation part being configured to connect the adapter to a connector.

6. The adapter as claimed in claim 1, wherein a rear upper wall is equipped with a knob provided with a tooth.

7. The adapter as claimed in claim 1, wherein at least one rear side wall is equipped with a groove delimited by at least one ramp.

8. The adapter as claimed in claim 1, wherein the adapter is configured to actuate the rear part.

9. A connecting device formed by:
   a connector; and
   an adapter configured to be fitted to an end part of a drive arm, the adapter comprising:
   at least one front part, at least one section of which is U-shaped, and
   at least one rear part, at least one section of which is U-shaped,
   wherein the front part and the rear part are hinged together via a hinge,
   wherein the front part comprises a body and a front end, the body being connected to the rear part via the hinge, wherein the front end and the body are delimited by a rim which overhangs the body to form a recess for receiving a front edge of an upper wall of the end part of the drive arm,
wherein the rim defines a rotation axis along a transversal direction of the adapter,
wherein, during assembly of the adapter with the end part of the drive arm, the adaptor and the end part of the drive arm are rotationally connected around the rotation axis, wherein the body comprises a rotation means arranged to rotatably connect the adapter to a connector.

10. A wiper system comprising:
the drive arm;
a connector attached to a wiper arm; and
the adapter according to claim 1 connecting the connector to the drive arm rotationally.

\* \* \* \* \*